United States Patent [19]
Date et al.

[11] Patent Number: 5,692,136
[45] Date of Patent: Nov. 25, 1997

[54] MULTI-PROCESSOR SYSTEM INCLUDING PRIORITY ARBITRATOR FOR ARBITRATING REQUEST ISSUED FROM PROCESSORS

[75] Inventors: Yuuki Date; Masanobu Inaba, both of Yamanashi, Japan

[73] Assignee: NEC Corporation, Tokyo, Japan

[21] Appl. No.: 685,748

[22] Filed: Jul. 24, 1996

Related U.S. Application Data

[63] Continuation of Ser. No. 408,879, Mar. 24, 1995, abandoned.

[30] Foreign Application Priority Data

Mar. 30, 1994 [JP] Japan ................... 6-059696

[51] Int. Cl.⁶ ................................................. G06F 13/00
[52] U.S. Cl. ........................... 395/287; 395/859; 395/301
[58] Field of Search ........................ 395/730, 287, 395/291–294, 297, 299, 301, 729–731, 478, 859

[56] References Cited

U.S. PATENT DOCUMENTS

| | | | |
|---|---|---|---|
| 3,543,242 | 11/1970 | Adams, Jr. et al. | 395/293 |
| 3,921,145 | 11/1975 | Emm et al. | 395/294 |
| 4,090,238 | 5/1978 | Russo | 395/293 |
| 4,334,288 | 6/1982 | Booher | 395/301 |
| 4,449,183 | 5/1984 | Flahive et al. | 395/293 |
| 4,473,880 | 9/1984 | Budde et al. | 395/294 |
| 4,514,728 | 4/1985 | Ahuja | 395/294 |
| 4,554,628 | 11/1985 | Bell | 395/297 |
| 4,627,018 | 12/1986 | Trost et al. | 395/287 |
| 4,835,672 | 5/1989 | Zenk et al. | 395/478 |
| 4,924,380 | 5/1990 | McKinney et al. | 395/291 |
| 4,941,086 | 7/1990 | Kriz | 395/294 |
| 4,953,081 | 8/1990 | Feal et al. | 395/291 |
| 4,964,034 | 10/1990 | Jaskowlak | 395/294 |
| 4,991,084 | 2/1991 | Rodiger et al. | 395/291 |
| 5,038,274 | 8/1991 | Nielsen | 395/311 |
| 5,051,946 | 9/1991 | Zubranich et al. | 395/291 |
| 5,274,785 | 12/1993 | Kuddes et al. | 395/291 |
| 5,274,822 | 12/1993 | Stanton et al. | 395/732 |
| 5,280,591 | 1/1994 | Garcia et al. | 395/291 |
| 5,317,696 | 5/1994 | Hilgendorf | 395/294 |
| 5,341,052 | 8/1994 | Dike et al. | 395/294 |
| 5,371,893 | 12/1994 | Price et al. | 395/729 |

FOREIGN PATENT DOCUMENTS

| | | |
|---|---|---|
| 0464237A1 | 1/1992 | European Pat. Off. . |
| 0549248A2 | 6/1993 | European Pat. Off. . |

*Primary Examiner*—Ayaz R. Sheikh
*Attorney, Agent, or Firm*—Whitham, Curtis, Whitham & McGinn

[57] ABSTRACT

In a multi-processor system, a priority arbitrator receives a request issued from each of processors, and arbitrates conflicts occurring among the requests. The requests derived from the respective processors are inputted via selectors to fixed priority arbitrating circuits. Only one request is selected by the fixed priority arbitrating circuit, and the selected request is held in an output register. The pending request is detected by an AND circuit, and the detection result is held in a pending register. When there is such a request held in the pending register, the subsequent request is not selected by the selector. The priorities of the plural fixed priority arbitrating circuits within the multi-processor system may be made different from each other, depending upon the use conditions of the multi-processor system.

20 Claims, 8 Drawing Sheets

MULTI-PROCESSOR SYSTEM INCLUDING PRIORITY ARBITRATOR FOR ARBITRATING REQUEST ISSUED FROM PROCESSORS

This application is a continuation of application Ser. No. 08/408,879, filed Mar. 24, 1995 now abandoned.

BACKGROUND OF THE INVENTION

The present invention generally relates to a multi-processor system. More specifically, the present invention is directed to a multi-processor system including a priority arbitrator for arbitrating requests issued from the respective processors.

In multi-processor systems, requests should be sent out from a plurality of processors to a plurality of memory modules, or between a plurality of processors. For instance, in the multi-processor system of FIG. 1, each of the priority arbitrators 401 to 404 outputs to the output port, any one of the request signals supplied from its four input ports. As a consequence, each of the selectors 501 to 504 selects any one of the four request data. In this case, various methods have been conventionally proposed as to how to arbitrate these requests in the priority arbitrators 401 to 404.

As the most primitive priority arbitrator, the fixed priority arbitrating method has been proposed in which the fixed priority has been given to the respective input ports, and then the arbitration is continuously performed in accordance with this priority. In this fixed priority arbitrating method, the specific input port is always treated at a high priority. Thus, there is such a problem that throughput of the overall multi-processor system could not be increased. In this case, such a fixed priority arbitrating circuit as shown in FIG. 6 is used as the exemplified example.

Also, the round robin method has been proposed such that the priority orders of the respective input ports are modified in a cyclic form. For this conventional round robin method, a large amount of hardware is required for the circuit to cyclically change the priority orders. More seriously, many requests are processed out of order.

To solve the above-described problems, for instance, in U.S. Pat. No. 4,991,084 entitled "NxM ROUND ROBIN ORDER ARBITRATING SWITCHING MATRIX SYSTEM" issued to W. K. Rodiger et al., after a confirmation is made that all of the once accepted request groups have been outputted, the next request is acceptable so as to avoid passing of the request. That is, referring to FIG. 7, each of the priority arbitrating circuits 401 to 404 in FIG. 1 includes the register 930 for holding the input request group, the NOR gate 960 for detecting that the not yet outputted request is left in this register 930, the fixed priority arbitrating circuit 920 for arbitrating the respective requests by applying the fixed priority orders to these requests, and the AND gate 950 for acquiring the new request group from the input port when the NOR gate 960 detects that there is no remaining request. When the requests held in the register 930 are arbitrated to be outputted, the outputted requests are reset. As a result, the succeeding request could not be entered into the register 930 until all of the requests which have been held at the same time are outputted. In other words, the requests produced at the different timings are processed in order.

However, the above-described round robin order arbitrating switching matrix system has the below-mentioned problems.

That is, referring to FIG. 7 and FIG. 8, assuming that the requests are inputted at the port 1 and port 3 at the time instant T1, this request signal is held in the register 930 at the next time instant T2. Then the request of the port 1 is selected by the fixed priority arbitrating circuit 920. "1" is outputted at only the output port 1 and "0" is outputted at other output ports. As a consequence, the request supplied from the port 3 is held and is outputted at the subsequent time instant T3.

When the request from the port 3 is outputted at the time instant T3, all the storage contents of the register 930 become "0." Therefore, all the outputs are equal to "0" at the time instant T4. The NOR gate 960 informs the AND gate 950 that all the outputs become "0." As a consequence, the request which has been inputted at the port 2 from the time instant T2 is fetched by the register 930 at the time instant T5 and then is outputted therefrom without any conflict.

Considering the above-described operation of this system, although the request supplied from the port 2 has been inputted since the time instant T2, no request is issued at the time instant T4. This is because such a judgement is made as to whether or not the subsequent request should be received based on the storage content of the register 930.

Another problem is caused by that the fixed priority arbitrating circuit 920 employed in the respective priority arbitrators 401 to 404 is operated in accordance with the same priority order. In other words, the specific input port is treated with a high priority in all of the priority arbitrators 401 to 404, so that the requests are processed unevenly. As a result, such a problem is produced that performance of the overall system cannot be increased.

SUMMARY OF THE INVENTION

An object of the present invention is to solve the above-described problem, and therefore to arbitrate requests at high throughput without providing any interruptions among the requests in a multi-processor system.

Another object of the present invention is to execute a request arbitration in such a manner that requests entered from the respective input ports are substantially evenly processed.

In a multi-processor system, according to one preferred embodiment of the present invention, comprising a plurality of processors, a plurality of ports from which requests are outputted from the processors, and a plurality of priority arbitrators for arbitrating the requests from the processors for each of these plural ports, each of these plural priority arbitrators includes: a fixed priority arbitrating circuit for selecting one of these requests from the processors in accordance with a certain fixed priority order; a pending circuit for detecting such a request which is not selected by the fixed priority arbitrating circuit but is made pending, and for holding a detection result; and a selector which does not newly accept a further request when there exists the request held in the pending circuit.

BRIEF DESCRIPTION OF THE DRAWINGS

The present invention may be readily appreciated from a preferred embodiment with reference to the accompanying drawings, in which.

DETAILED DESCRIPTION OF THE PREFERRED EMBODIMENT

Figure 1:
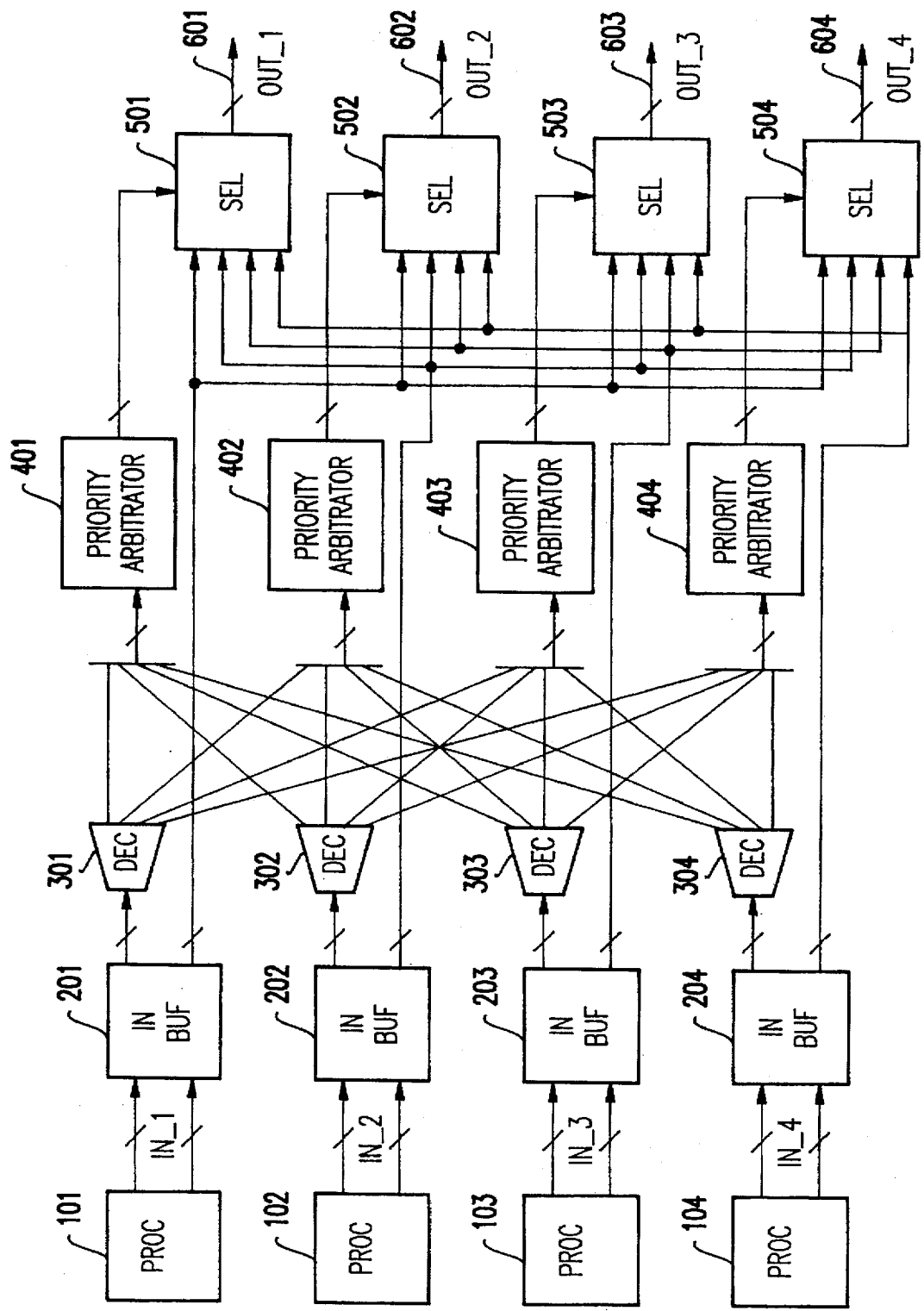
FIG. 1 is a schematic block diagram for indicating an overall arrangement of a multi-processor system to which the present invention is applied.

Referring to the drawings, a multi-processor system according to an embodiment of the present invention will be described in detail.

In FIG. 1, there is schematically shown a multi-processor system to which the present invention is applied. This multi-processor is constructed of four processors 101 to 104, input buffers 201 to 204 connected to the corresponding processors 101 to 104, and decoders 301 to 304 for decoding destination addresses. The multi-processor further includes priority arbitrators 401 to 404 for arbitrating conflicts occurring in output ports of the decoders 301 to 304, and selectors 501 to 504 for selecting requests issued from the input buffers 201 to 204 in response to the outputs from the priority arbitrators 401 to 404. The requests issued from the four processors 101 to 104 are entered together with the destination addresses into the input buffers 201 to 204 respectively. Then, the respective destination addresses are decoded by the decoders 301 to 304 and are outputted as request signals therefrom, which will be supplied to the priority arbitrators 401 to 404. In response to the request signals supplied by the decoders 301 to 304 to the input ports, the priority arbitrators 401 to 404 select one request to be supplied as a control signal to the corresponding one of these selectors 501 to 504. Upon receipt of the control signal derived from the priority arbitrators 401 to 404, the selectors 501 to 504 output the requests from the input buffers 201 to 204. The request outputs 601 to 604 selected by the selectors 501 to 504 may be connected to a memory module, or the processors.

The processors 101 to 104 output the memory access requests and the data transfer requests to other processors into each of the corresponding input buffers 201 to 204. These input buffers are arranged as FIFO (first-in first-out) buffers. When the preceding request is reserved, the subsequent requests are brought into the waiting conditions at these input buffers 201 to 204.

The decoders 301 to 304 decode the 2-bit destination address into the 4-bit destination address. The decoded signals are one by one entered into the priority arbitrators 401 to 404 of the corresponding output ports.

Each of these selectors 501 to 504 is such a selector having 4 inputs and 1 output. Also, the respective selector has a bit width equal to the bit width of the request derived from the input buffers 201 to 204.

Figure 2:
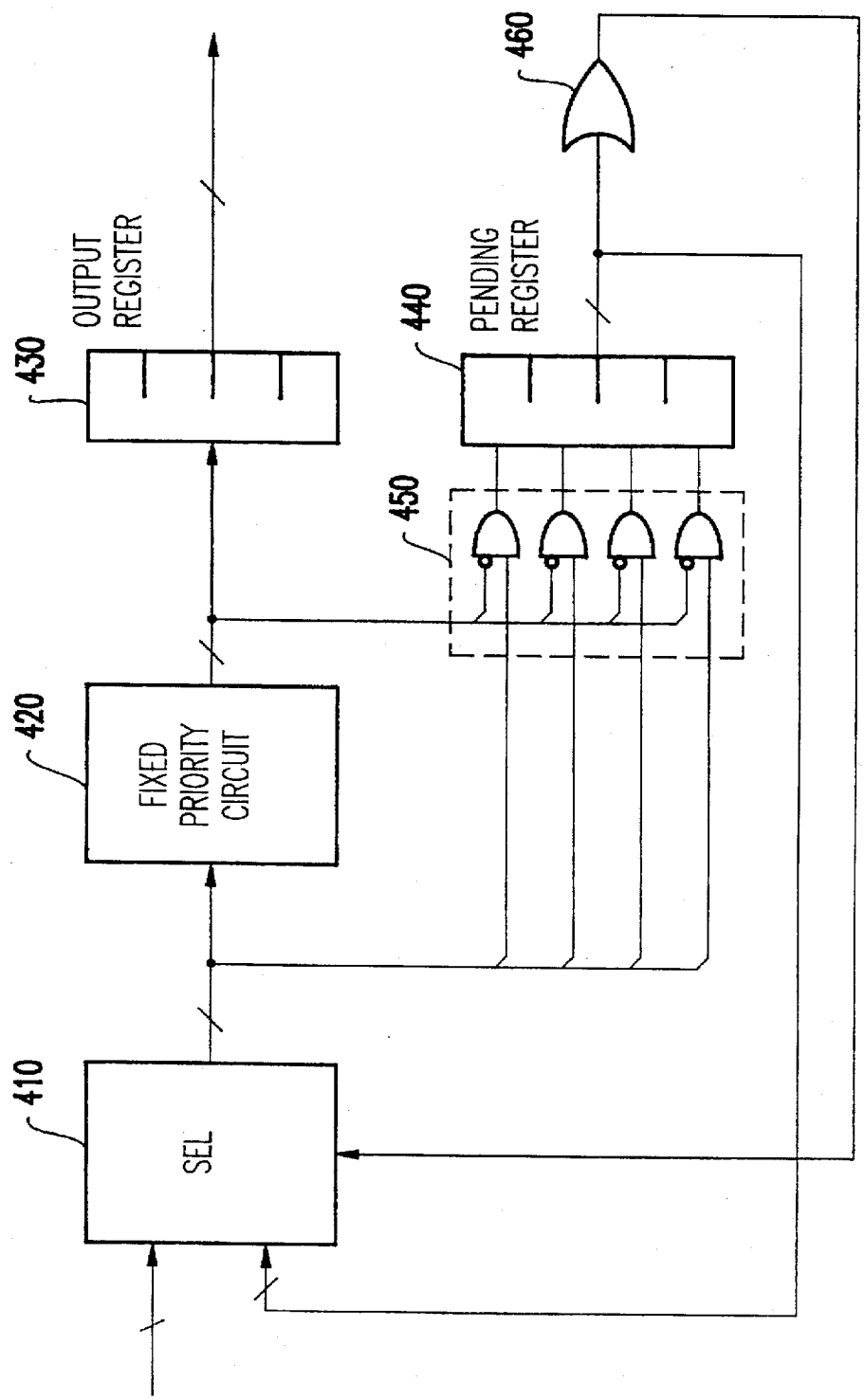
FIG. 2 is a schematic block diagram for showing a priority arbitrator according to an embodiment employed in the multi-processor system of the present invention.

Referring now to FIG. 2, each of the priority arbitrators 401 to 404 includes a selector 410, a fixed priority arbitrating circuit 420 for arbitrating the output selected from the selector 410, and an output register 430 for holding the output from the fixed priority arbitrating circuit 420. The priority arbitrator further employs an AND circuit 450 for detecting the request suspended by the fixed priority arbitrating circuit 420, a pending register 440 for holding the output from the AND circuits 450, and an OR circuit 460 for detecting whether or not a request is maintained in the pending register 440.

It should be understood in this embodiment that although the description is made of use of a reference numeral like "410" for the selector shown in FIG. 2, when the more restrictive explanation is required for the arrangement of the specific priority arbitrator, it may be specified by using the least significant numeral. For instance, when the selector 410 provided within the priority arbitrator 401 is specified, it is referred to "selector 411."

The selector 410 has one input terminal for receiving the 4-bit request signals supplied from the decoders 301 to 304, and another input terminal to receive the 4-bit output signal derived from the pending register 440. Which input signal this selector 410 may output is determined based upon the output from the OR circuit 460. That is, if at least 1 bit of the output signal from the pending register 440 is "1," then the output from the OR circuit 460 becomes "1." In this case, the output signal value of the pending register 440 is outputted from the selector 410. On the other hand, if all the output signals of the pending register 440 are "0," then the output from the OR circuit 460 becomes "0." In this case, the request signals derived from the decoders 301 to 304 are outputted from the selector 410.

Figure 6:
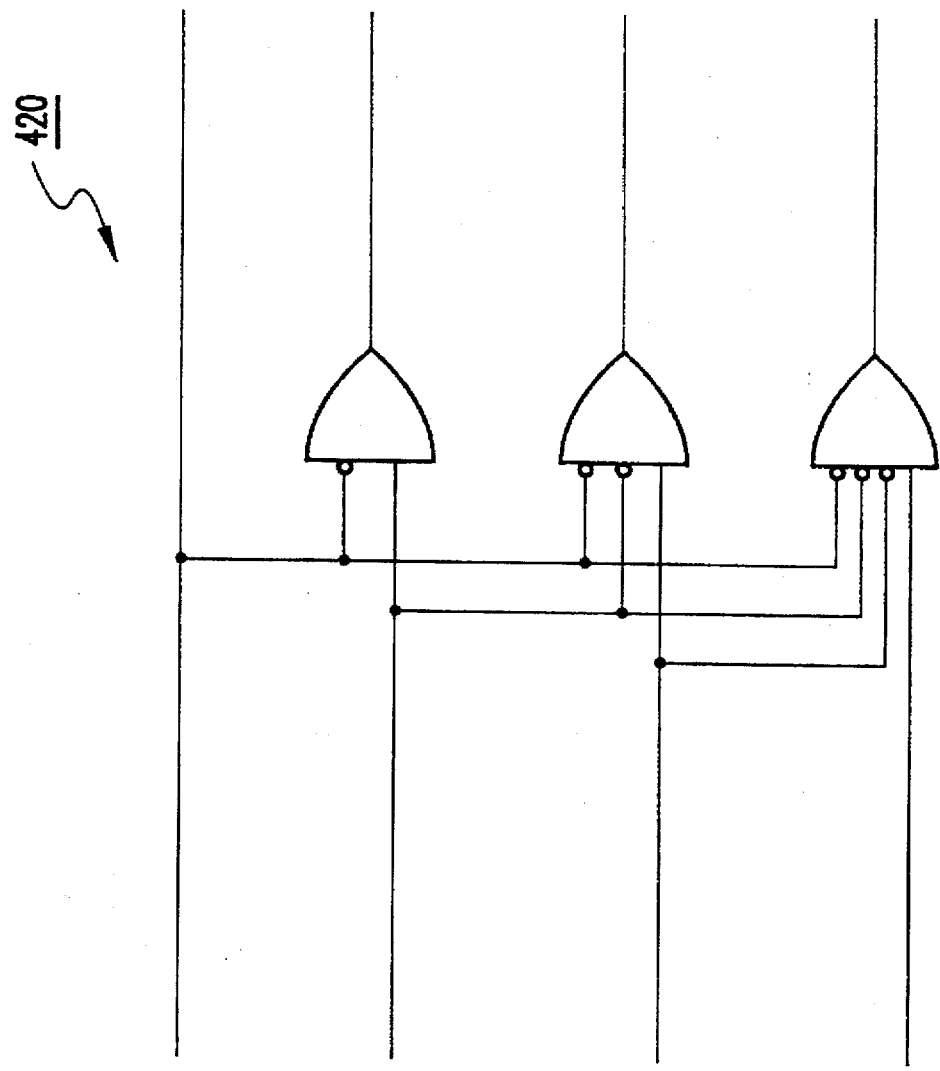
FIG. 6 is a schematic block diagram for representing an example of a fixed priority arbitrator.
Figure 7:
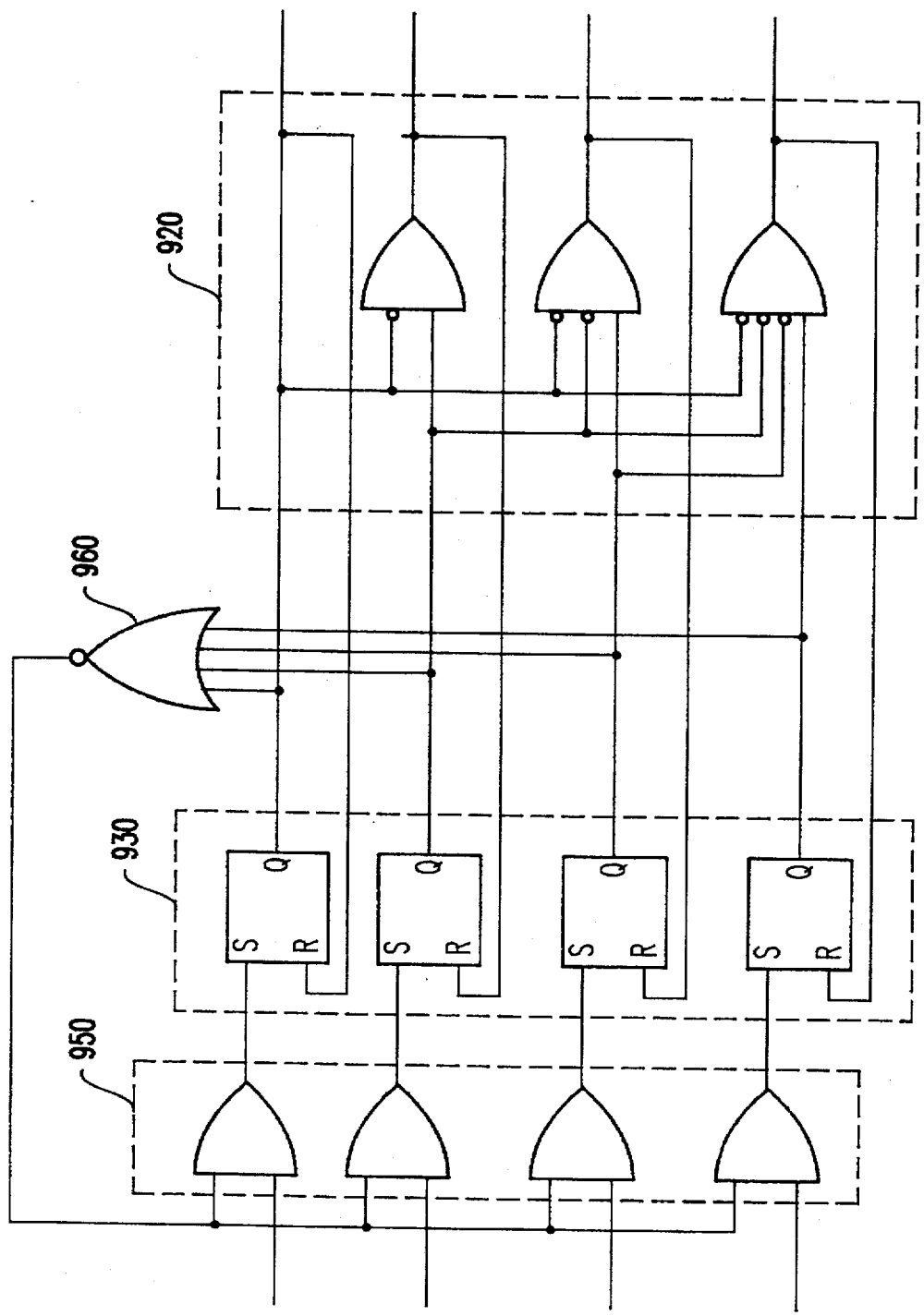
FIG. 7 schematically shows the conventional priority arbitrator.

The fixed priority arbitrating circuit 420 arbitrates the 4-bit signals outputted from the selector 410 in such a way that at most 1 bit becomes "1." In other words, in the case that either all the bit are "0," or only 1 bit is "1," the input signal to this fixed priority arbitrating circuit 420 directly outputs this input data. When a plurality of bits among the input data are "1," only 1 bit is selected from these plural bits equal to "1," and all other bits are set to "0." One exemplified circuit of the fixed priority arbitrating circuit is represented in FIG. 6. In FIG. 6, the upper bit is selected with a high priority. That is, when such a data "0110" (sequenced from top to bottom) is supplied to this fixed priority arbitrating circuit, the third bit "1" of this data is masked by the AND circuit, so that another data "0100" is outputted.

As described above, referring back to FIG. 2, the output register 430 holds the arbitrated result by the fixed priority arbitrating circuit 420. The outputs of these output registers 431 to 434 are used as control signals of the selectors 501 to 504, respectively.

The AND circuit 450 detects the request signal held by the fixed priority arbitrating circuit 420. That is, this AND circuit 450 AND-gates an inverted signal of the output signal from the fixed priority arbitrating circuit 420 and the input signal thereof, so that the remaining request signal which has not been selected is outputted from the fixed priority arbitrating circuit 420.

The output signals from the AND circuit 450 are held by the pending register 440 and may be arbitrated in the next cycle. In other words, when at least 1 bit of the output (data) signal from the pending register 440 is equal to "1," since the output signal of this pending register 440 is selected by the selector 410, the subsequent request signal is not acceptable but the request signal held in the pending register 440 is processed with a high priority.

Figure 3:
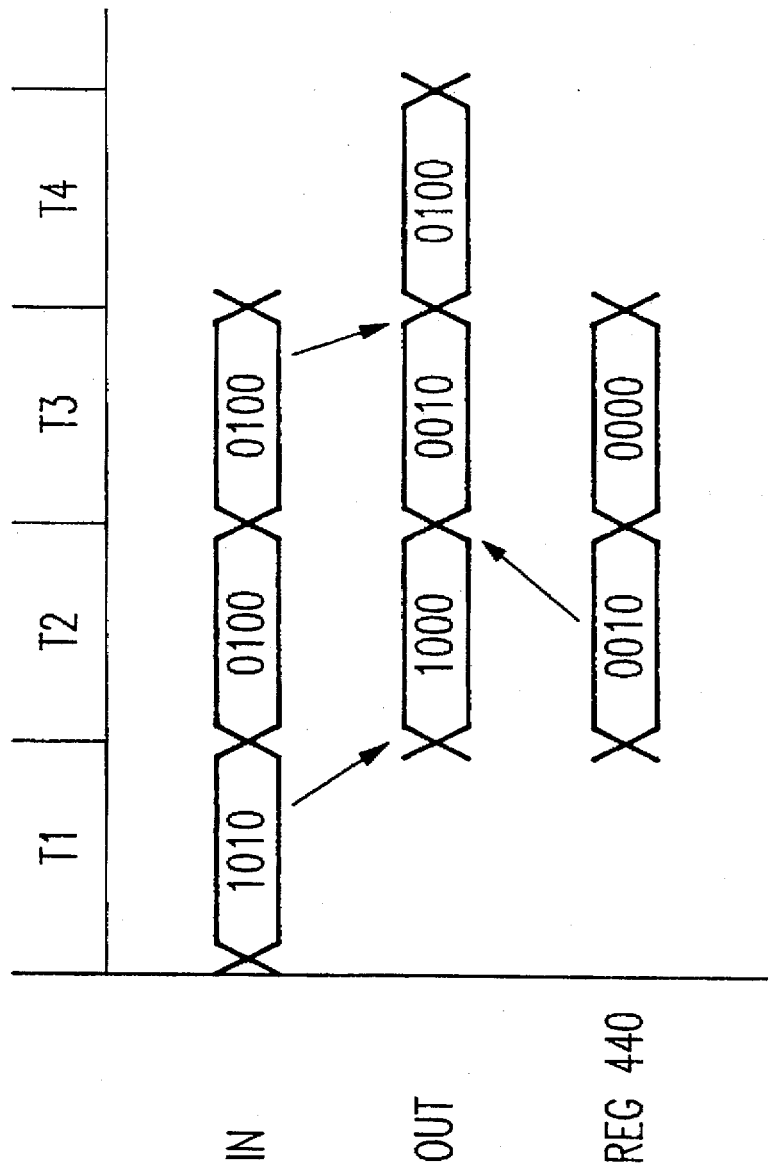
FIG. 3 shows a timing chart for explaining request arbitration by the priority arbitrator according to the embodiment of the present invention.

With employment of the above-described circuit arrangement, one of the problems of the conventional multi-processor can be solved as follows:

Referring to FIG. 2 and FIG. 3, a request signal "1010" inputted into the selector 410 at a time instant T1 implies that request signals appear at the first port and the third port. Assuming that all the storage contents of the pending register 440 are "0," the request signal at the time instant T1 is selected by the selector 410. Also, assuming that the input ports of the fixed priority arbitrating circuit 420 are prioritized from the first port via the second port and the third port to the fourth port with a high priority, the first port is selected, and a request signal "1000" is held in the output register 430 whereas another request signal "0010" is held in the pending register 440 at a time instant T2.

At this time, since the output signal of the pending register 440 contains "1," the output signal of this pending register 440 is selected by the selector 410. In the case, since the output signal of the pending register 440 is "0010," a request signal "0010" is stored in the output register 430 and another request signal "0000" is stored in the pending register 440 at a time instant T3.

As the storage content of the pending register 440 corresponds to "0000" at this time instant, the inputted request signal is selected at the time instant T3. Accordingly, the subsequent request signal "0100" is stored into the output register 430.

Figure 8:
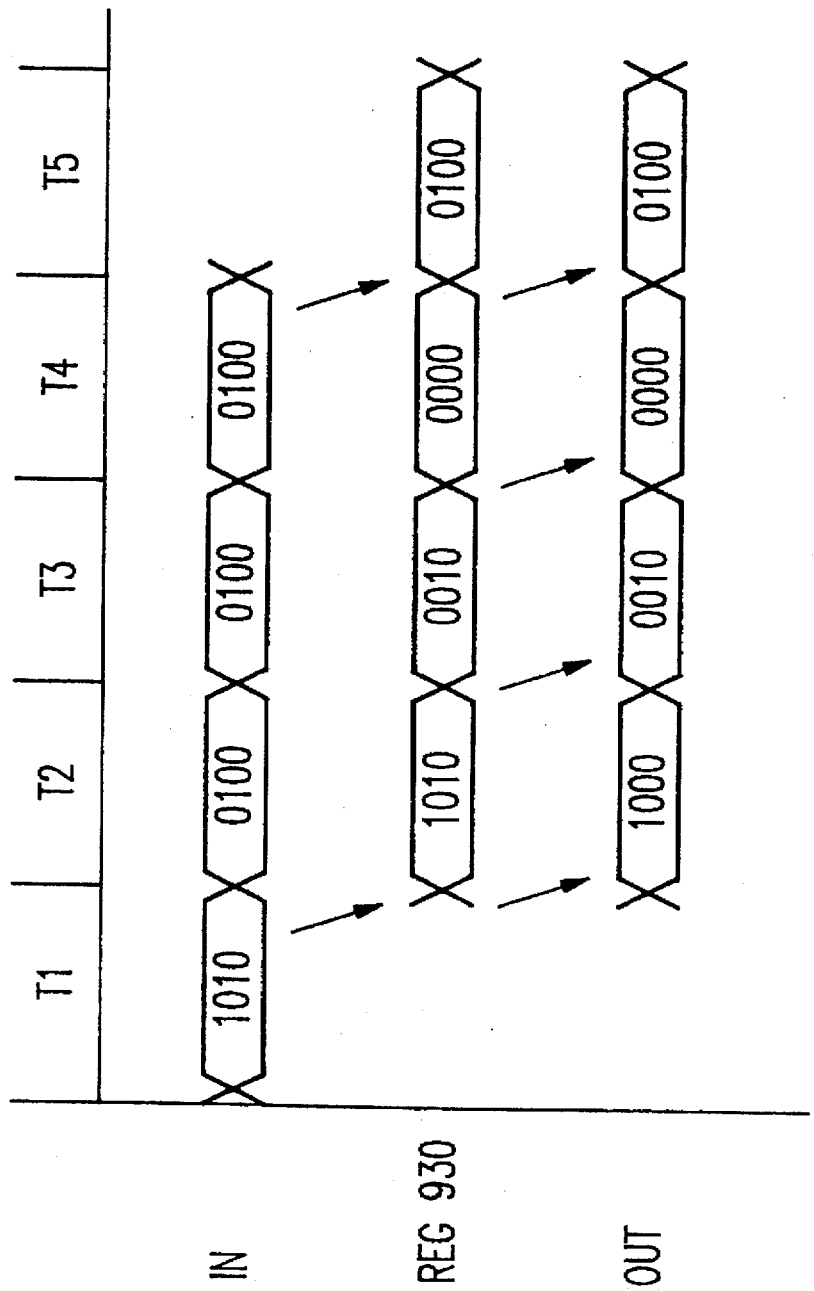
FIG. 8 is a timing chart for explaining the conventional request arbitration.

Comparing the arbitration timing of FIG. 3 according to one embodiment of the present invention with that of FIG. 8 in the prior art, the output signal becomes "0000" at the time instant T4 in this conventional multi-processor, so that there is an empty slot of the issuance of the request during 1 cycle. To the contrary, the succeeding request signal "0100" is issued at the time instant T4 in the multi-processor of the present invention. This is caused by the judgement based on the resultant request signal held in the register 930 of the conventional multi-processor. On the other hand, according to the present invention, by the judgement based on the resultant request left in the pending register 440, the remaining request is directly arbitrated for the next issuance.

Next, a description will be made of another feature of the priority arbitrator employed in the multi-processor system of the present invention.

In the priority arbitrators 401 to 404 of the multi-processor system indicated in FIG. 1, the fixed priority arbitrating circuits 421 to 424 of FIG. 2 may separately define the priority from each other. As an example, it is conceivable as in the circuit of FIG. 6 that the ports of all of these fixed priority arbitrating circuits 421 to 424 are prioritized from the first port to the fourth port in this order. As another example, it is conceivable that the input ports of the first fixed priority arbitrating circuit 421 are prioritized from the fixed port via the second and third ports to the fourth port with a high priority in this order, and the input ports of the second fixed priority arbitrating circuit 422 are prioritized from the second port via the third and fourth ports to the first port with a high priority in this order. Further, the input ports of the third fixed priority arbitrating circuit 423 are prioritized from the third port via the fourth and first ports to the second port with a high priority in this order, and the input ports of the fourth fixed priority arbitrating circuit 424 are prioritized from the fourth port via the first and second ports to the third port with a high priority in this order. In particular, according to the latter method which will be referred to a "fixed rotate allocation" hereinafter, the priority orders may be more evenly given to the respective input ports.

First, a description will now be made of operations of the fixed priority arbitrating circuits 421 to 424 with reference to FIG. 4 in such a case that the input ports of all the fixed priority arbitrating circuits 421 to 424 are prioritized from the first port via the second and third ports to the fourth port with a high priority in this order. It should be noted in FIG. 4 that, for instance, symbol "C [3→1]" indicates a "request C outputted from the third processor 103 to the first output 601." A first-line signal represents a request issued from a processor at each of the inputs. A second-line signal shows a request held at a head element of input buffers. A third-line signal denotes a request held in a second element of the input buffers.

When at a time instant T1, a request A from the first processor 101, a request B from the second processor 102, a request C from the third processor 103, and a request D from the fourth processor 104 are entered, since both the request A and the request C own the same first output as destination, a conflict will occur. Then, these requests A and C are arbitrated by the priority arbitrator 401. Since the input from the first port has a higher priority in this case, the request A is outputted to the first output 601 at the time instant T2. The request C is once held in the input buffer 203 and then is outputted with a delay of 1 cycle at the time instant T3.

At the time instant T2, the request E competes with the request F at the second port, so that the request E derived from the first port has a high priority and thus is outputted at the time instant T3. The request F is once held in the input buffer 202, and thereafter is outputted with a delay of one cycle at the time instant T4. Since the request C is held in the head of the input buffer 203 at the third port of the input port, the request G is not subject to the output, so that this request G is held at the head element of the input buffer 203 at the time instant T3.

At the time instant T3, a request I from the first port competes with a request G of the input buffer 203 of the third port at this third port, and the request I from the first port owns a high priority. Since this request G is held in the input buffer 203, the request K is not subject to the output, and is held at a second buffer of the input buffer 203.

At a time instant T4, a request M from the first port competes with a request J of the input buffer 202 of the second port at the fourth port, and then the request M from the first port has a high priority. The request J is continued to be held in the input buffer 202, and is outputted at a time instant T6.

As described above, the respective requests are sequentially outputted, and all of the requests A to P are outputted at a time instant T7.

Subsequently, operations of the multi-processor system when the priority is determined in accordance with the above-explained "fixed rotate allocation" with reference to FIG. 5.

Figure 5:
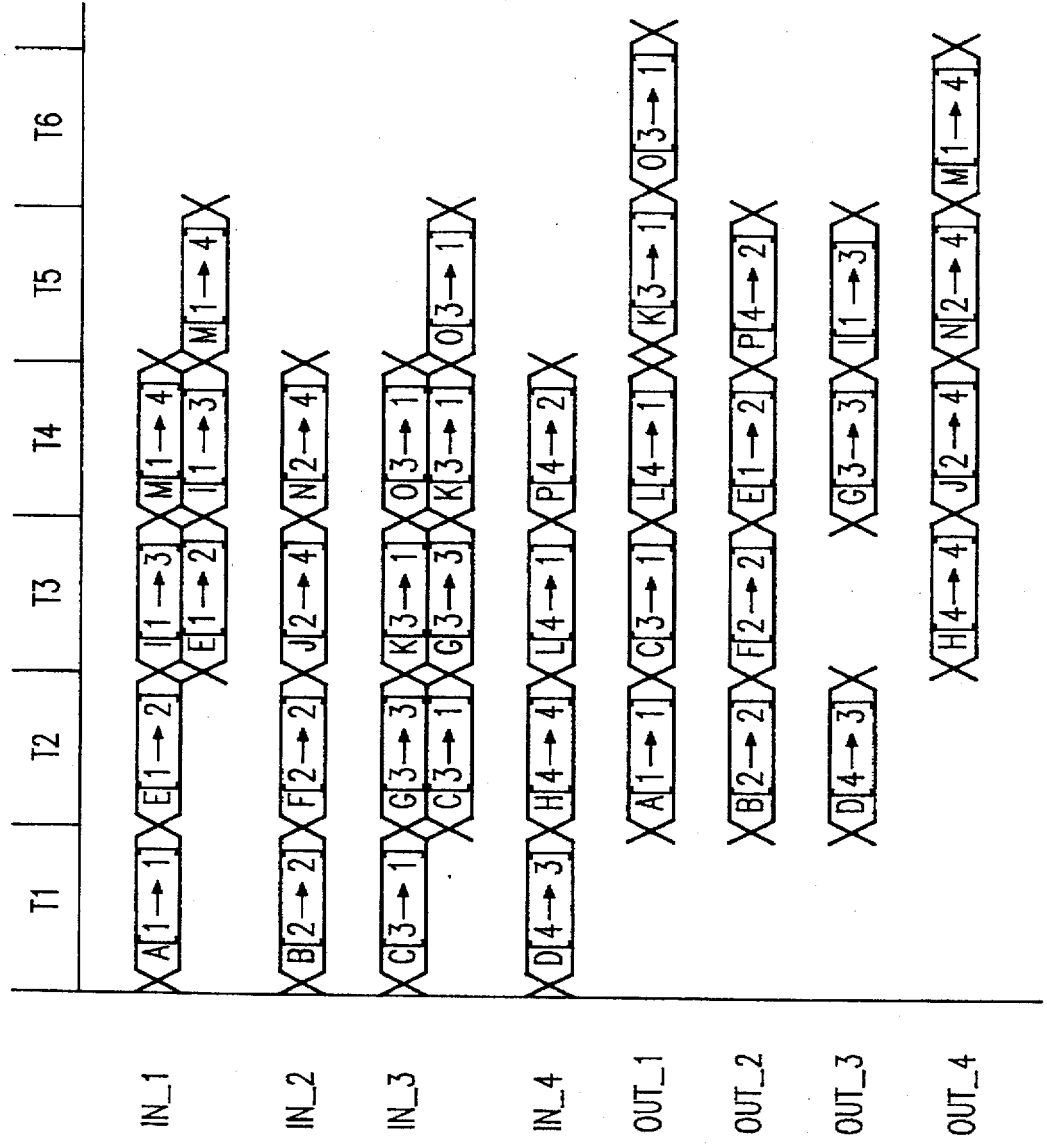
FIG. 5 is a timing chart for showing another process operation of the priority arbitrator according to the embodiment of the present invention.

At a time instant T1 shown in FIG. 5, when a request A is inputted from the first processor, a request B is entered from the second processor, a request C is supplied from the third processor, and a request D is inputted from the fourth processor, since both the request A and the request C are outputted from the same first port, a conflict occurs. Thus, both requests A and C are arbitrated by the priority arbitrator 401. In this case, since the request A inputted from the first port can have the higher priority, the request A is outputted to the first output 601 at a time instant T2. The request C is once held in the input buffer 203, and then is outputted with a delay of 1 cycle at a time instant T3.

At the time instant T2, a request E competes with a request F at the second port. In accordance with the fixed rotate allocation, since the second port of the input port owns the higher priority than the first port at the second port of the output port the request F from the second port has a high priority and outputted at the time instant T3. Since a request C is held in the head of the input buffer 203 at the third port of the input port, the request G is not subject to the output, and is held at the head element of the input buffer 203 at the time instant T3.

At the time instant T3, as the request E is held in the head of the input buffer 201 at the first port of the input port, a request I is not subject to the output. As a result, no conflict occurs among these requests at this time instant T3.

Similarly, also at a time instant T4, since the request I is held at the head of the input buffer 201 at the first port of the input port, a request M is not subject to the output. As a consequence, no conflict occurs between the requests even at this time instant T4.

The respective requests are successively outputted in the above-described manner, and all of the requests A through P are outputted at a time instant T6.

Figure 4:
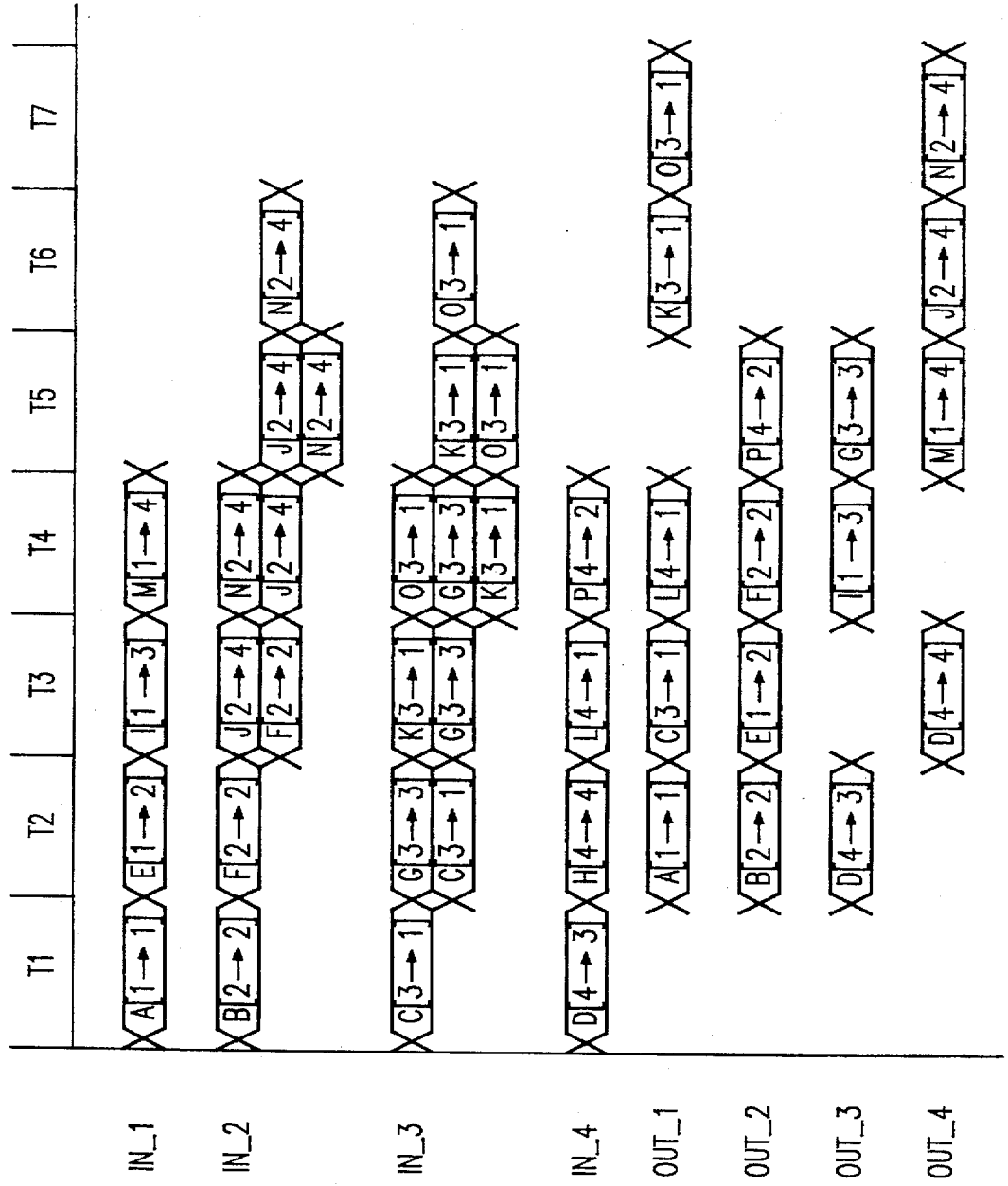
FIG. 4 is a timing chart for representing one process operation of the priority arbitrator according to the embodiment of the present invention.

Comparing now FIG. 4 with FIG. 5, it may be understood that the performance of the entire multi-processor system in the case of FIG. 5 that the priority of the fixed priority arbitrating circuits 421 to 424 is determined based on the fixed rotate allocation could be improved, as compared with that of the FIG. 4 case where all the priorities thereof employed in the priority arbitrators 401 to 404 are the same. It should be noted in this example that relatively even requests are issued. When there are an extremely large number of requests from the first port of the input port, high performance may be expected when all the priorities of the fixed priority arbitrating circuits 421 to 424 are identical to each other.

As previously explained in detail, in the multi-processor system of the present invention, the requests can be arbitrated in such a manner that these requests are outputted without unnecessary empty slots. There is a further merit that the requests produced from the respective processors are evenly arbitrated, so that the performance of the entire system could be increased.

What is claimed is:

1. A multi-processor system comprising:
   a plurality of processors, a plurality of ports for outputting first requests from said processors, and a plurality of priority arbitrators for arbitrating the first requests from said processors for each of said plurality of ports,
   wherein each of said plurality of priority arbitrators includes:
     a fixed priority arbitrating circuit;
     a pending circuit for detecting, by comparing between an input and an output of said fixed priority arbitrating circuit, such second request which have not been selected by said fixed priority arbitrating circuit but have been suspended, and for holding said second requests; and
     a selector which selects either one of said second requests from said pending circuit and said first requests from said processors,
   wherein said fixed priority arbitrating circuit arbitrates to select one request from the output of said selector in accordance with a fixed priority order;
   wherein said selector accepts further requests from any of said processors when there is no request in said pending circuit,
   wherein said selector does not newly accept further requests from any of said processors when said second requests are held in said pending circuit, and
   wherein sets of requests are processed such that there is no delay between adjacent sets of requests.

2. The multi-processor system as claimed in claim 1, wherein said pending circuit further includes:
   a first detecting circuit for detecting, by comparing between said input and said output of said fixed priority arbitrating circuit, such said second requests which have not been selected by said fixed priority arbitrating circuit but have been suspended;
   a pending register for holding said second requests by said first detecting circuit; and
   a second detecting circuit for detecting whether there is a request left in said pending register.

3. The multi-processor system as claimed in claim 2, wherein said selector selects the output from said pending register when said second detecting circuit judges that a second request is left in said pending register, and
   wherein said selector selects a first request newly supplied from said processor when said second detecting circuit judges that no second request is left in said pending register.

4. The multi-processor system as claimed in claim 3, wherein said second detecting circuit includes a single "N"-input OR gate for providing an output to said selector, wherein "N" is a number of said processors.

5. The multi-processor system as claimed in claim 2, wherein, based on a judgement by said pending circuit that a resulting request is left in the pending register, a remaining second request is directly arbitrated for a next issuance, such that no interruptions occur during processing of said plurality of requests.

6. The multi-processor system as claimed in claim 2, wherein said first detecting circuit comprises a plurality of AND gates each for receiving said output of said fixed priority arbitrating circuit and said output of said selector.

7. The multi-processor system as claimed in claim 6, wherein said second detecting circuit includes a single "N"-input OR gate for providing an output to said selector, wherein "N" is a number of said processors.

8. The multi-processor system as claimed in claim 2, wherein said second detecting circuit includes a single "N"-input OR gate for providing an output to said selector, wherein "N" is a number of said processors.

9. The multi-processor system as claimed in claim 1, wherein each of said fixed priority arbitrating circuits included in said plurality of priority arbitrators selects one of the first requests issued from said processors in accordance with such priority orders having the mutually same and fixed priorities.

10. The multi-processor system as claimed in claim 1, wherein each of said fixed priority arbitrating circuits included in said plurality of priority arbitrators selects one of the first requests issued from said processors in accordance with such priority orders having the mutually different and fixed priorities.

11. The multi-processor system as claimed in claim 1, wherein the first requests from any of said processors are output from one of said ports in order of time.

12. The multi-processor system as claimed in claim 1, wherein each of said pending circuits holds only one set of second requests at a same time.

13. The multi-processor system as claimed in claim 1, wherein said plurality of requests are processed such that no interruptions are present during processing of said plurality of requests.

14. The multi-processor system as claimed in claim 1, wherein said plurality of requests from respective ones of said plurality of ports are substantially evenly processed, such that no interruptions are present during processing of said plurality of requests.

15. The multi-processor system as claimed in claim 1, wherein each of said fixed priority arbitrating circuits separately define a priority from one another.

16. The multi-processor system as claimed in claim 1, wherein said plurality of requests are processed such that no empty time slots exist during processing of said plurality of requests.

17. The multi-processor system as claimed in claim 1, wherein each of said pending circuits holds one set of second requests at a same time, and accepts new requests only when all of said one set of second requests have been processed.

18. The multi-processor system as claimed in claim 1, wherein said pending circuit includes a first detecting circuit comprising a plurality of AND gates each for receiving said output of said fixed priority arbitrating circuit and said output of said selector.

19. The multi-processor system as claimed in claim 18, wherein said pending circuit further includes a second detecting circuit, said second detecting circuit comprising a single "N"-input OR gate for providing an output to said selector, wherein "N" is a number of said processors.

20. The multi-processor system as claimed in claim 1, wherein said pending circuit includes a detecting circuit having a single "N"-input OR gate for providing an output to said selector, wherein "N" is a number of said processors.

* * * * *